United States Patent
Siessegger et al.

(10) Patent No.: US 9,491,820 B2
(45) Date of Patent: Nov. 8, 2016

(54) HYBRID DIMMING CONTROL TECHNIQUES FOR LED DRIVERS

(71) Applicants: Bernhard Siessegger, Danvers, MA (US); Benjamin Alexandrovich, Brookline, MA (US)

(72) Inventors: Bernhard Siessegger, Danvers, MA (US); Benjamin Alexandrovich, Brookline, MA (US)

(73) Assignee: OSRAM SYLVANIA INC., Wilmington, MA (US)

( * ) Notice: Subject to any disclaimer, the term of this patent is extended or adjusted under 35 U.S.C. 154(b) by 42 days.

(21) Appl. No.: 14/196,541

(22) Filed: Mar. 4, 2014

(65) Prior Publication Data

US 2015/0257222 A1    Sep. 10, 2015

(51) Int. Cl.
  H05B 41/24    (2006.01)
  H05B 41/38    (2006.01)
  H05B 41/392    (2006.01)
  H05B 33/08    (2006.01)

(52) U.S. Cl.
  CPC ...... *H05B 33/0818* (2013.01); *H05B 33/0821* (2013.01); *H05B 33/0845* (2013.01); *H05B 33/0827* (2013.01)

(58) Field of Classification Search
  None
  See application file for complete search history.

(56) References Cited

U.S. PATENT DOCUMENTS

| | | | |
|---|---|---|---|
| 7,902,768 B2 | 3/2011 | Zanforlin | |
| 2009/0267531 A1 | 10/2009 | Zanforlin | |
| 2010/0027306 A1 | 2/2010 | Loef et al. | |
| 2010/0301766 A1 | 12/2010 | Zudrell-Koch et al. | |
| 2011/0001439 A1 | 1/2011 | Cecconello et al. | |
| 2012/0062147 A1* | 3/2012 | Fan | H05B 33/0815 315/297 |
| 2013/0147269 A1* | 6/2013 | Zimmermann | H02J 9/02 307/23 |
| 2014/0354170 A1* | 12/2014 | Gredler | H05B 33/0815 315/224 |

* cited by examiner

*Primary Examiner* — Dedei K Hammond
(74) *Attorney, Agent, or Firm* — Andrew R. Martin; Shaun P. Montana

(57) ABSTRACT

Techniques are disclosed for dimming LED strings using frequency modulation (FM) dimming and burst control dimming. At high brightness levels, FM dimming may be used to decrease the current through LED strings by increasing the switching frequency of pulses within a pulse train of an AC current source. At low brightness levels, or after the switching frequency has been increased to the resonant frequency of the current source, burst control dimming may decrease the current through LED strings by decreasing the duty cycle of the pulse train of the current source. At high brightness levels, FM dimming and burst control dimming may be combined by decreasing the duty cycle of the pulse train at each of a number of increasing switching frequency values. FM dimming may also be combined with frequency hopping in order to increase the number of available frequency steps.

16 Claims, 15 Drawing Sheets

HYBRID DIMMING CONTROL TECHNIQUES FOR LED DRIVERS

FIELD OF THE DISCLOSURE

This disclosure relates to lighting driver circuitry, and more particularly, to LED drivers utilizing a series resonant inverter.

BACKGROUND

In fluorescent lamp ballasts, inverting a DC power supply voltage into AC current may involve utilizing series resonant inverters. DC-AC inverters for driving LED strings involve a number of non-trivial challenges.

DETAILED DESCRIPTION

Figure 1:
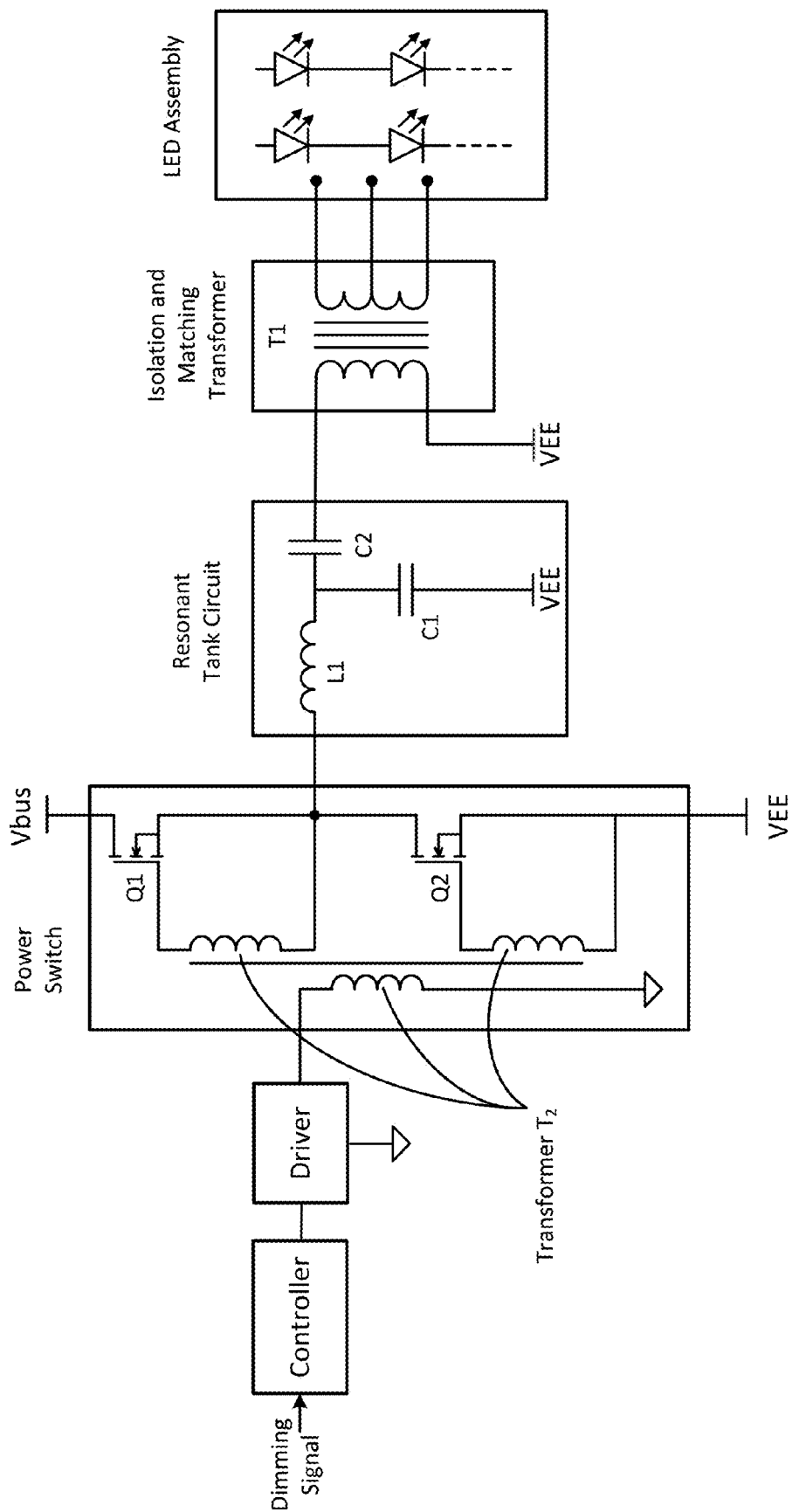
FIG. 1 shows an example lighting system configured with a series resonant inverter, in accordance with an embodiment of the present invention.

Techniques are disclosed for dimming LED strings using frequency modulation (FM) dimming and burst control dimming. At high brightness levels, FM dimming may be used to decrease the current through LED strings by increasing the switching frequency of pulses within a pulse train of an AC current source. In some embodiments, high brightness levels may include LED brightness levels between 100% full brightness and about 20% full brightness. At low brightness levels, or after the switching frequency has been increased to the resonant frequency of the current source, burst control dimming may decrease the current through LED strings by decreasing the duty cycle of the pulse train of the current source. In some embodiments, low brightness levels may include LED brightness levels below about 20% full brightness. FM dimming may be performed until the LED brightness level reaches a low brightness threshold (e.g., 20% full brightness), or until the switching frequency reaches a maximum threshold frequency (e.g., the resonant frequency of the current source), at which point burst control dimming may be used to further dim the LED strings. At high brightness levels, FM dimming and burst control dimming may be combined by decreasing the duty cycle of the pulse train at each of a number of increasing switching frequency values. FM dimming may also be combined with frequency hopping in order to increase the number of available frequency steps.

General Overview

As previously explained, series resonant inverters are used in fluorescent lamp ballasts and are an efficient means of implementing a DC-AC inverter. The output current of the inverter is independent of the load impedance and may behave like a stiff AC current source. Such inverters may also be suitable for driving LED strings, and the resonant inverter could be either self-oscillating or externally driven. In some embodiments, the operating frequency of such inverters is optimized in terms of their cost and performance. The frequency may be selected, for example, in the range of 20 kHz-1 MHz. The transformer in the series resonant inverter may also be used to provide galvanic isolation between the input and the output of the inverter. Many lighting applications for LED sources may require a wide dimming range exceeding 10 bits (approximately 1000 times). Another requirement may be the accuracy of the light source dimming characteristics; for example, in some embodiments, the light output must be an accurately defined function of the control signal. Such a requirement, in practical terms, means that similar luminaires receiving the same control signal should be perceived indistinguishable in their color and intensity. Feed-forward current control through frequency modulation (FM) does not have the same control and accuracy and may not be suitable for dimming below, for example, 20% full power. However, feed-forward burst control dimming has well defined proportional characteristics and may be well suited for accurate dimming. The dimming range available through burst control may be limited by the carrier frequency, but it can be expanded by 4-5 times in some embodiments by also applying FM dimming allowing the inverter to operate at a relatively low frequency and offer cost and efficiency benefits. Furthermore, applying burst control dimming alone may lead to droop-related losses of about 10% at the dim level of ½ of full power and 20% loss at ¼ of full power. The phenomenon of "droop" loss describes the reduction of LED efficiency with increased amplitude of the LED current.

Thus, and in accordance with an embodiment of the present invention, techniques are disclosed for providing wide dimming range and high accuracy in LED control utilizing a series resonant inverter operating within its optimum frequency range. The proposed hybrid dimming techniques implement both FM and burst control dimming for driving LEDs and may provide a large dimming range while maintaining accuracy of the control characteristics. In one embodiment, the obtainable dimming range becomes the product of the dimming factors of both methods (e.g., about 500-1000 times in some embodiments). As used herein, "dimming" means LED current variation resulting in LED brightness changes. In some embodiments, the brightness change is proportional to the LED current variation, while in other cases calibration data may be stored in FLASH or EEPROM memory within a microcontroller unit (MCU) which allows compensation of any nonlinearity between the brightness change and LED current variation. In one example, high LED efficiency may be achieved at dimming levels from full power to ¼ full power by having FM control precede burst control. Frequency modulation control is equivalent to changing the DC current through the LEDs and may reduce the droop loss in some embodiments.

System Architecture

FIG. 1 illustrates an example dimming system configured with a series resonant inverter, in accordance with an embodiment of the present invention. In one example embodiment, an LED dimming system may include a controller, driver, power switch, resonant tank circuit, isolation and matching transformer, and an LED assembly. The driver circuit in this example is coupled to switching transistors $Q_1$ and $Q_2$ through a gate transformer $T_2$. The tank circuit in this example includes an inductor $L_1$, and capacitors $C_1$ (resonant capacitor) and $C_2$ (DC blocking capacitor); however, other LC circuit designs may be used and will be apparent in light of this disclosure. The LED load may include, for example, an array of LEDs, and coupling to the load may be made through an isolation and matching transformer. In this particular embodiment, the driver, power switch, resonant circuit, and transformer comprise the current source for the LED assembly. In one example, the turn ratio of the isolation and matching transformer provides optimal coupling and the ratio may be set to unity if the supply voltage is the design parameter. In such an example, the isolation and matching transformer could be taken out and the output of capacitor $C_2$ could be provided directly to the LED load assuming no galvanic isolation is required. In addition to isolating the LEDs from the mains, in some embodiments the transformer may also be used for load matching and voltage matching of unequal LED strings requiring different voltages. As mentioned above, the series resonant inverter could be self-oscillating or externally driven. For ease of description, examples are provided with externally driven series resonant inverters. The dimming signal applied to the controller may be a DC voltage, the phase-cut waveform from a wall dimmer, or a digital communication signal, in some embodiments. The digital communication could be accomplished, for example, by the means of wired control (e.g. DMX, DALI, etc.), power line communication (e.g. Echelon), or wireless control (e.g. ZigBee, EnOcean, etc.). In response to the dimming signal, the controller may change the parameters of the pulse train, creating a current burst at the converter output, in one embodiment. The frequency of the pulses within the train may be close to the resonant frequency of the tank circuit.

Figure 2:
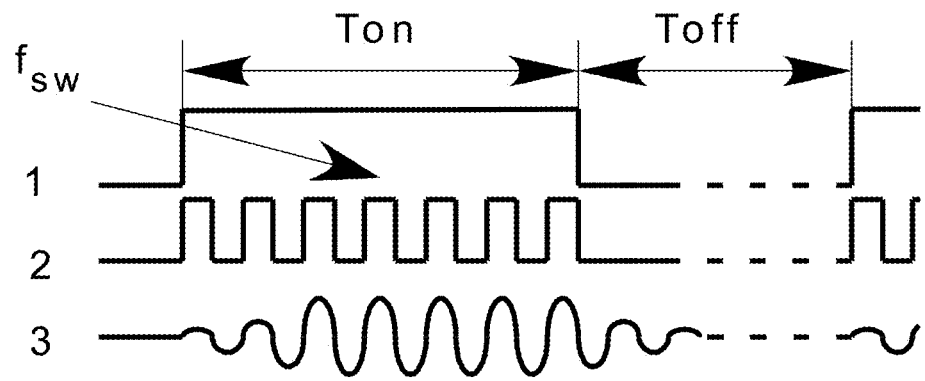
FIG. 2 shows example waveforms of the envelope of the pulse train, the pulse train with a frequency $f_{sw}$, and the current burst into the LED load, according to one embodiment of the present invention.

FIG. 2 shows example waveforms of the envelope of the pulse train (marked as waveform 1), the pulse train with a switching frequency $f_{sw}$ (marked as waveform 2), and the current burst into the LED load (marked as waveform 3), according to one embodiment of the present invention. As can be seen in this example, the duration of the envelope waveform determines the number of pulses within the pulse train. The sum of the on-time $T_{on}$ and off-time $T_{off}$ equals the period T which determines the dimming frequency $F_{dim}=1/T=1/(T_{on}+T_{off})$. The dimming frequency $F_{dim}$ is the frequency of the envelope of the pulse trains also referred to as modulation frequency or burst repetition rate. In some embodiments, the output current burst of the resonant inverter may be translated proportionally into the light output of the LEDs. This current may be controlled, for example, by changing the number of pulses in the train (e.g., by changing the duration of the envelope signal ON cycle, or the duty cycle of $T_{on}$) which is known as burst control dimming, or by varying the frequency $f_{sw}$ of the pulses within the train which is known as frequency modulation (FM) dimming. Both control functions may be implemented, for example, using a commercial MCU.

During burst control dimming, the transient phenomena at the beginning and the end of the ON cycle may limit the duration of $T_{on}$ to, for example, 5-10 train pulse periods, corresponding to a minimum $T_{on}$ of about 5-10 µs. Burst modulation may be perceived by the human eye similar to PWM, and its minimum frequency may be limited by flicker and strobe effects. To avoid flicker, the minimum frequency may be, for example, 100 Hz. In some embodiments, the modulation frequency may be increased to, for example, 1 kHz, which corresponds to the period of the modulation signal, minus 1000 µs. In such an embodiment, the dimming range may be limited to a factor of about 100. One example solution could be to raise the inverter frequency $f_{sw}$, however, increasing the frequency above 500 kHz significantly increases the cost and may jeopardize efficiency, in some embodiments. As discussed above, the hybrid dimming techniques described herein allow the inverter to operate at a relatively low frequency and offer cost and efficiency benefits. In some cases, the converter efficiency does not decrease when burst dimming is applied because no energy is dissipated during the pause between bursts, while the efficiency decrease during FM dimming can be made insignificant by adjustment of the dead time of the switches.

Figure 3:
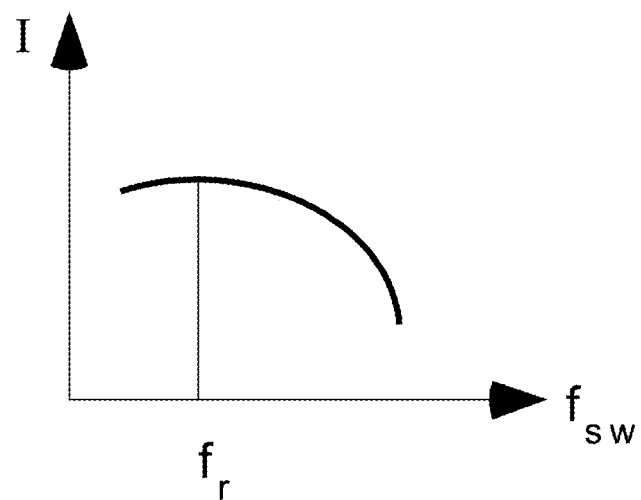
FIG. 3 illustrates a graph of example control characteristics of a frequency modulated inverter, configured according to an embodiment of the present invention.

FIG. 3 illustrates a graph of example control characteristics of a FM inverter, configured according to an embodiment of the present invention. As discussed above, the current control through FM may not have the same control accuracy at low dimming levels, in some embodiments. In this particular example, the inverter output current reaches a maximum when the driving signal frequency, $f_{sw}$, is close to the resonant frequency of the output tank, $f_r$ (sometimes also referred to as $F_0$. By raising the driving frequency, the output current may be decreased; however, operation below the resonant frequency is not desirable as it may lead to high switching loss in some embodiments. Thus, according to one embodiment of the present invention, FM control dimming may be implemented until $f_{sw}$ reaches a maximum frequency, $f_{max}$, at which point further dimming may be achieved via burst control by reducing the duty cycle of the current bursts. In one particular embodiment, $f_{max}$ is substantially equal to $f_r$.

Figure 4:
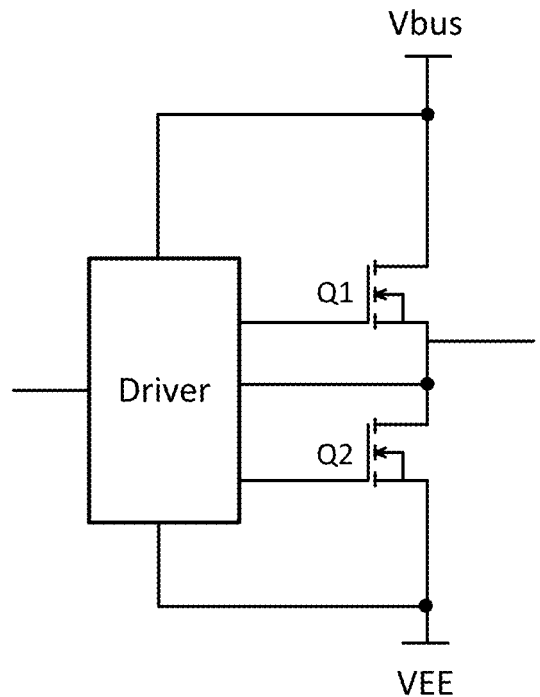
FIG. 4 shows a driver circuit configured according to another embodiment of the present invention.
Figure 5:
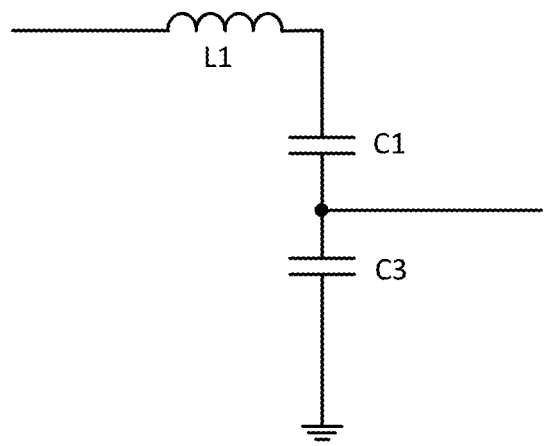
FIG. 5 shows an alternative LC circuit design for coupling to the load, according to an embodiment of the present invention.

As discussed above, various topologies and designs of the functional blocks shown in FIG. 1 will be apparent in light of this disclosure. For example, while the driver of FIG. 1 is coupled to the switching transistors though a transformer, other embodiments may not require a transformer. FIG. 4 shows a modified driver circuit with two outputs providing pulses to gates of the high and low voltage side of the switching transistors $Q_1$ and $Q_2$, configured according to an embodiment of the present invention. In order to minimize cost and component count, such a driver may be monolithically integrated into an IC. Such an IC may also minimize switching loss by creating pulses with optimal dead time. In some embodiments, properly shaped pulses may prevent simultaneous conduction of the switches while at the same time reducing the losses in the anti-parallel diodes (e.g., the body-diodes in case of MOSFETs) by utilizing synchronous rectification. Coupling to the load may also be implemented, for example, using a capacitive divider. FIG. 5 shows an alternative LC circuit design for coupling to the load, according to an embodiment of the present invention. In this particular example, the LC circuit includes inductor $L_1$ and capacitors $C_1$ and $C_3$, and the step-down transformation is achieved through the capacitive divider. The ratio of $C_3$ to $(C_1+C_3)$ defines the transformation factor, in this example. Such an LC circuit may be a cost effective alternative to a magnetic transformer.

Figure 6D:
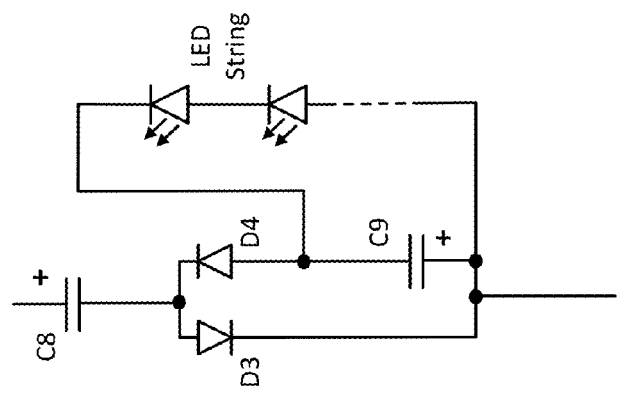
FIGS. 6a-d show alternative LED load configurations, according to multiple embodiments of the present invention.
Figure 6C:
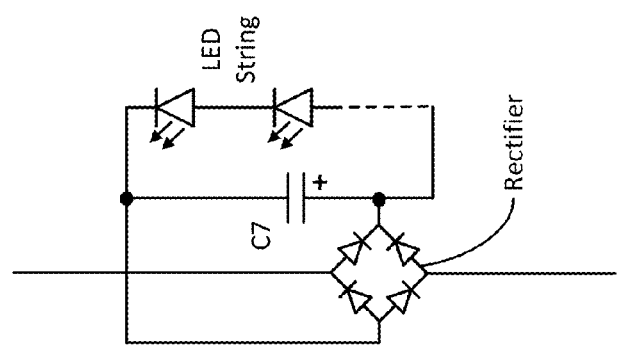
Figure 6B:
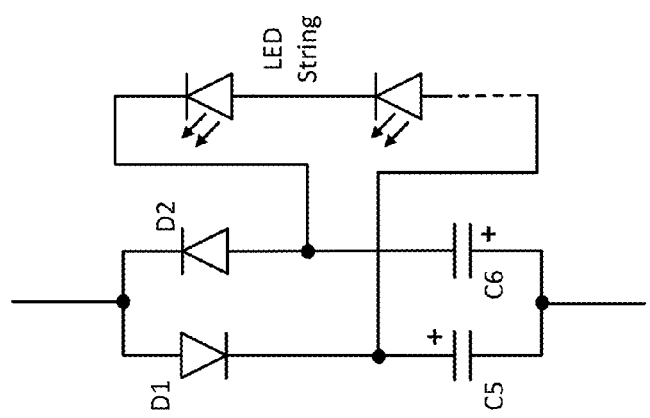
Figure 6A:
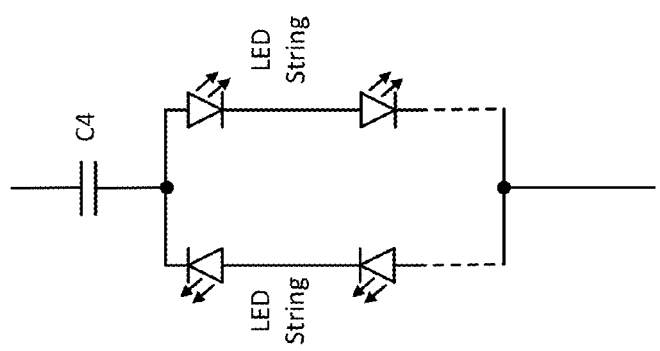

FIGS. 6a-d illustrate various LED assembly configurations that may be applied to the LED assembly of FIG. 1, according to multiple embodiments of the present invention. FIG. 6a shows an example anti-parallel connection of LED strings with AC current flowing through each string for half of the period, according to one embodiment of the present invention. A capacitor $C_4$ may be included ahead of the anti-parallel LED strings, as shown in this example. Such a configuration may be a low cost but energy inefficient solution due to droop loss. The efficacy of LEDs can be improved, for example, in the alternative arrangements shown in FIGS. 6b-d. In such arrangements, the capacitors C5-9 which follow the rectifier in FIG. 2c and the rectifying diodes D1-4 in FIGS. 6b and 6d may store enough energy to supply nearly DC current into the LEDs, in some embodiments, thus reducing the droop loss which emanates from the ripples at the switching frequency $f_{sw}$. In some embodiments, different topologies may be mixed within one circuit.

Figure 7:
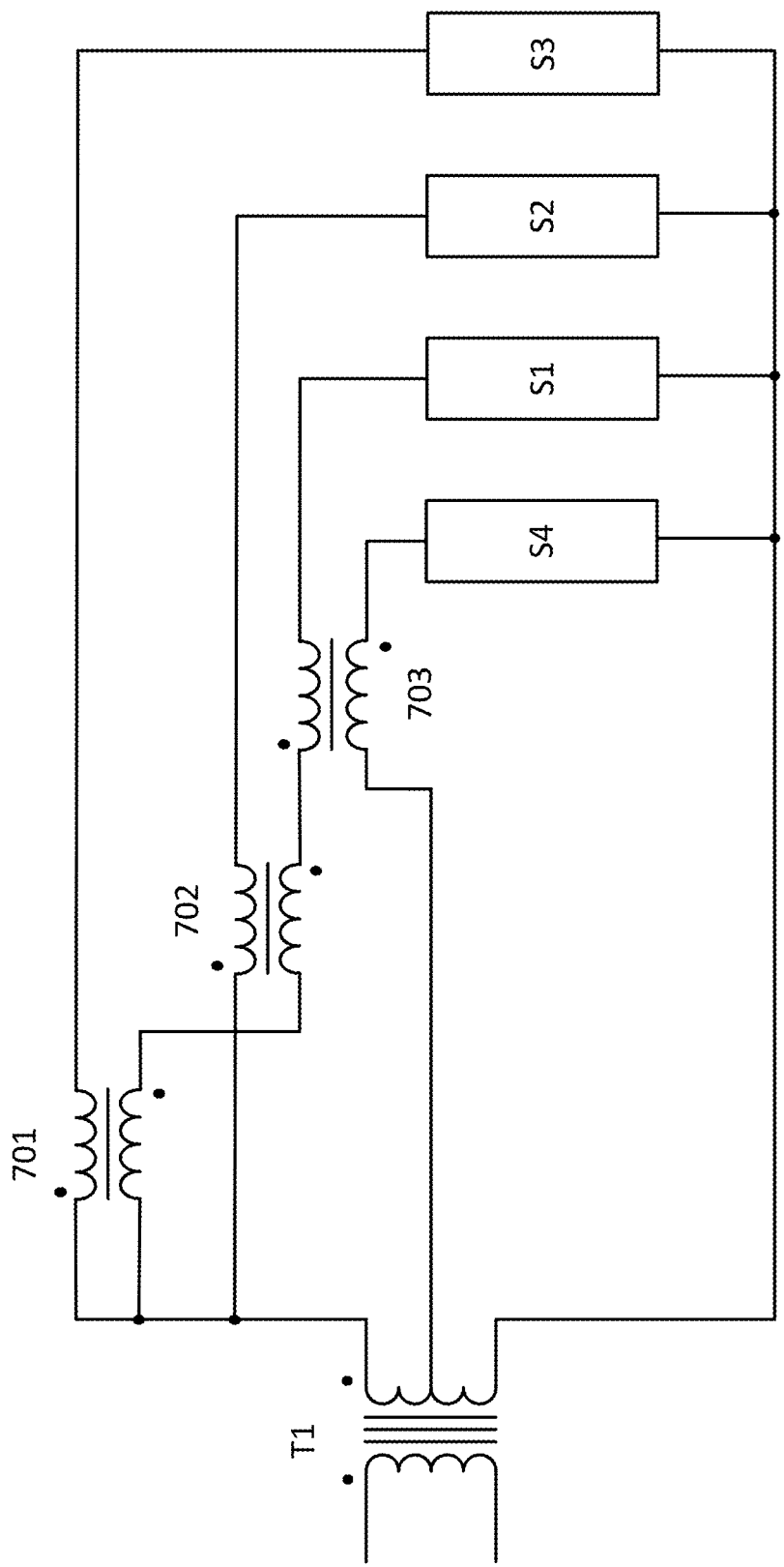
FIG. 7 shows a circuit design for splitting the output current of the inverter between multiple LED assemblies, in accordance with an embodiment of the present invention.

FIG. 7 shows a circuit design for splitting the output current of the inverter between multiple LED assemblies, in accordance with an embodiment of the present invention. The AC current from the inverter may be a constant current that is almost independent of the load, in some embodiments, and current splitters may be used in order to perform parallel driving of multiple LED assemblies. Each LED assembly, which may include rectifier diodes and capacitors, may be implemented in numerous topologies, such as the ones shown in FIGS. 6a-d, in some embodiments. Such current splitters may be low loss, small size magnetic components. In the specific example shown, the output current of the inverter is split between four LED assemblies, $S_1$-$S_4$. For the purpose of this example, each of the LED assemblies $S_1$-$S_3$ has the same number of LEDs, thus resulting in approximately equal string voltages, and the string $S_4$ is shorter and has a lower voltage. In such a configuration, the turn ratio of the primary and secondary side of the transformer $T_1$ should be selected for the optimal match of the load impedance to the resonant circuit. The transformer $T_1$ might be identical with the transformer $T_1$ shown in FIG. 1, even though other drive circuits feeding the primary of transformer $T_1$ can be used in accordance with this disclosure. The number of turns at the tip-off of the secondary, which feeds the load $S_4$ in this example, may be chosen to match its voltage to the voltages of LED assemblies $S_1$-$S_3$. In this embodiment, the current splitters 701, 702, and 703 ensure that the current in each LED assembly is inversely proportional to the turn ratio of the primary and secondary side of the splitter; if the turn ratio equals one, the currents are equal. Therefore, if the turn ratios of all current splitters 701, 702, and 703 are equal, then all four LED assemblies $S_1$-$S_4$ will be supplied with equal current.

Each of the LED load arrangements shown above may vary the current in multiple strings synchronously, i.e. to the same dimming level, in some embodiments. If the luminaire requires color tuning, a separate inverter may be provided for each of the color channels. In such an example, each of the inverters could share the same DC power supply and the same controller.

Figure 8A:
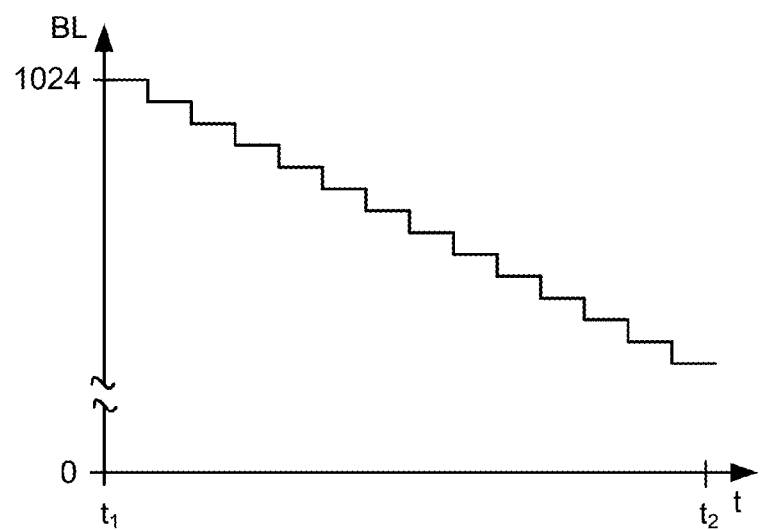
FIGS. 8a-c are graphs of the brightness level BL, switching frequency $f_{sw}$, and duty cycle D during FM dimming, according to an embodiment of the present invention.
Figure 8B:
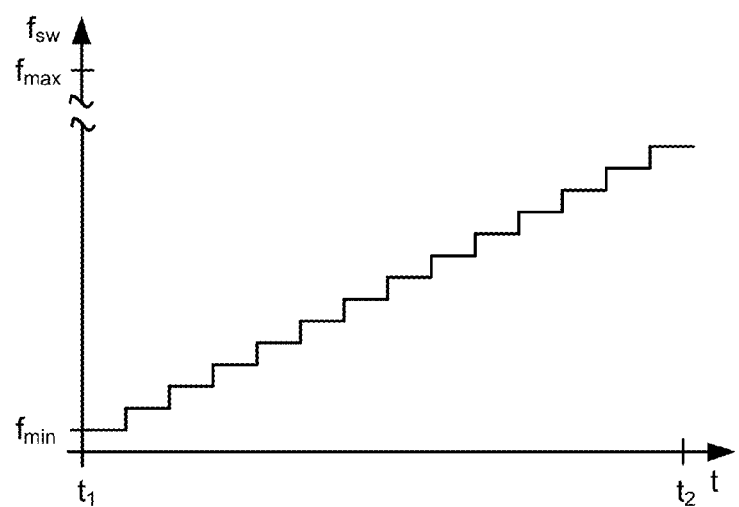
Figure 8C:
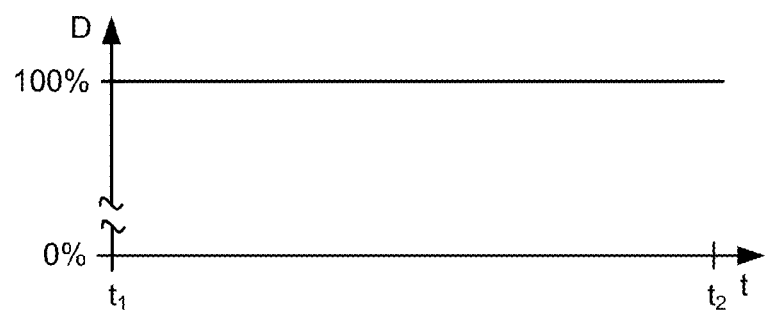

FIGS. 8a-c are graphs of the brightness level, switching frequency $f_{sw}$, and duty cycle during FM dimming, according to an embodiment of the present invention. As can be seen in the example of FIG. 8a, the brightness level begins at a maximum brightness level (BL) of 1024 and decreases gradually as the switching frequency increases. In this particular example, 10 bits are used to control brightness, and 1024 is the BL control word. The brightness level may be communicated to the LED driver, for example, via the communication means described above. For dimming at high brightness levels, the frequency $f_{sw}$ shown in FIG. 8b is increased starting from $f_{min}$ towards $f_{max}$. As the frequency reaches $f_{max}$, the frequency is held constant and from now on the duty cycle D of the bursts may be reduced to achieve further dimming (see, for example, FIGS. 9a-c). As can be seen in this example, while the frequency is increasing, the brightness level decreases proportionally and the duty cycle shown in FIG. 8c is held constant at 100%.

Figure 9A:
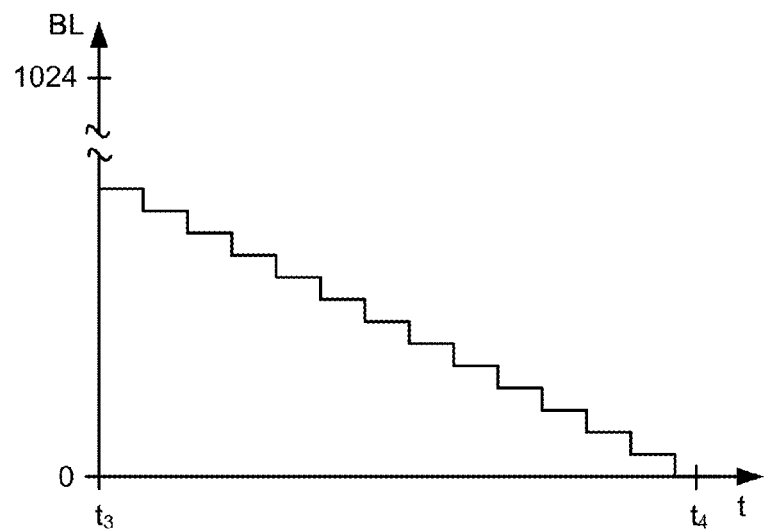
FIGS. 9a-c are graphs of the brightness level BL, switching frequency $f_{sw}$, and duty cycle D during burst control dimming, according to an embodiment of the present invention.
Figure 9B:
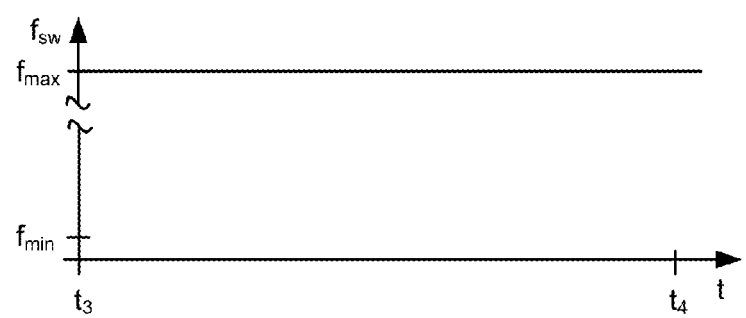
Figure 9C:
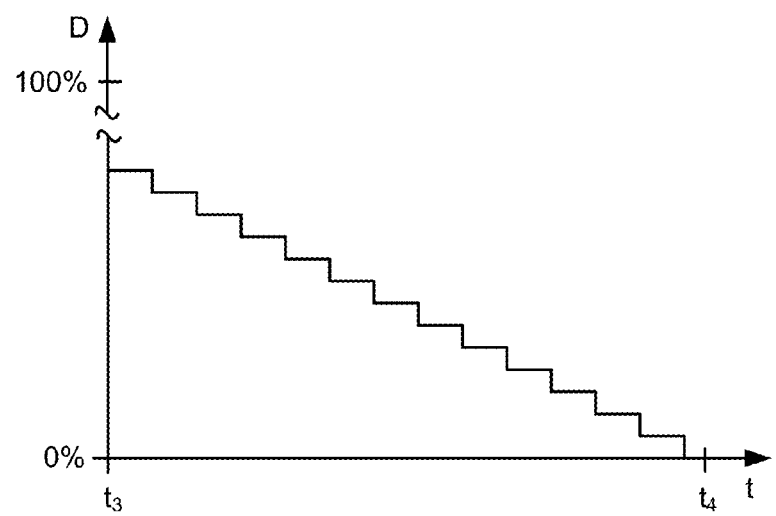

FIGS. 9a-c are graphs of the brightness level, switching frequency $f_{sw}$, and duty cycle during burst control dimming, according to an embodiment of the present invention. As can be seen in FIG. 9b, the switching frequency is held constant at $f_{max}$, and in order to achieve further dimming at low brightness levels (e.g., below 20% full brightness), the duty cycle D decreases as shown in FIG. 9c. As the duty cycle decreases, the brightness level also decreases as shown in FIG. 9a.

In some embodiments, off-the-shelf MCUs may implement this hybrid dimming algorithm, allowing relatively inexpensive and compact realization of the proposed dimming techniques. This is true for feed-forward as well as closed-loop control systems. In one particular example, a fully digital control loop may provide a minimal number of components and increased flexibility in a closed-loop system and an error amplifier and compensation network may also be implemented in software in the MCU or a digital signal processor (DSP). For compact but low cost solutions, the available frequency resolution might be an issue for fully utilizing the advantages of frequency dimming. For example, an inverter operating at a high switching frequency may realize a compact design, but in order to be low cost instead of a high speed DSP, a low cost MCU with a built in PWM-peripheral may be used to create the switching frequency for the inverter stage. Such an MCU may only be able to generate a few frequency steps between $f_{min}$ and $f_{max}$, and this would be perceived as course dimming rather than smooth dimming when the lighting control system reduces the brightness level gradually over time. For these and other cases when better dimming resolution is desired, a modified control algorithm may be used. In another embodiment, FM may be implemented along with the technique known as frequency "hopping", wherein the frequency alters between two discreet frequency values. Frequency hopping between two frequency values may produce an average frequency between the two values, thus providing more frequency steps than may be otherwise available from a particular MCU. At high brightness levels (e.g., between 100%-20% full brightness), FM may be utilized while the frequency resolution of the MCU's peripheral is virtually increased by hopping between two neighboring frequencies.

Figure 10A:
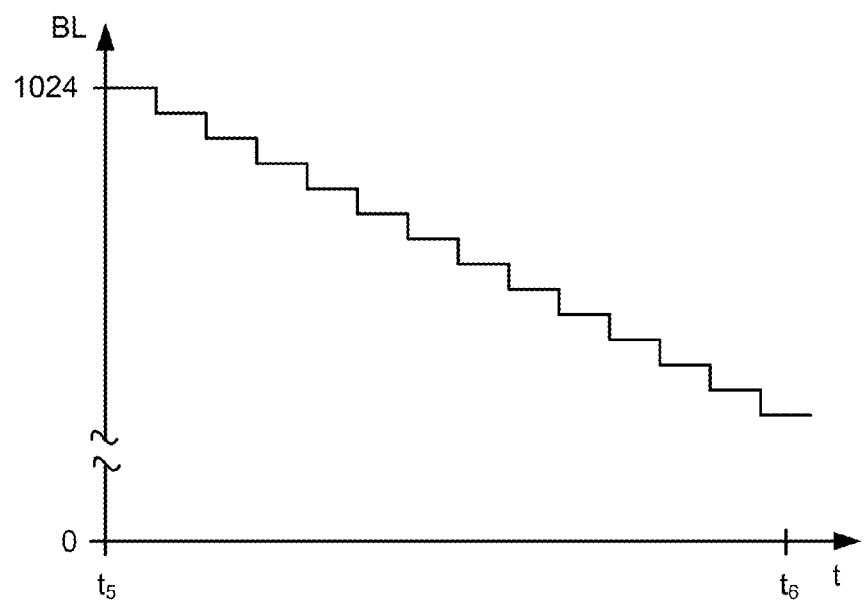
FIGS. 10a-c are graphs of the brightness level BL, switching frequency $f_{sw}$, and duty cycle D for a modified hybrid dimming technique, according to an embodiment of the present invention.
Figure 10B:
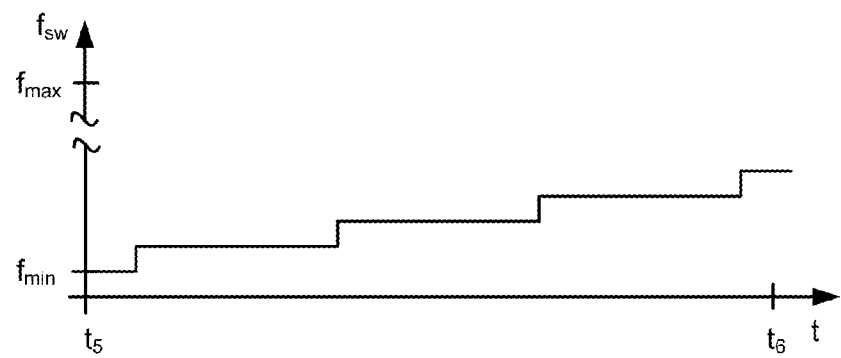
Figure 10C:
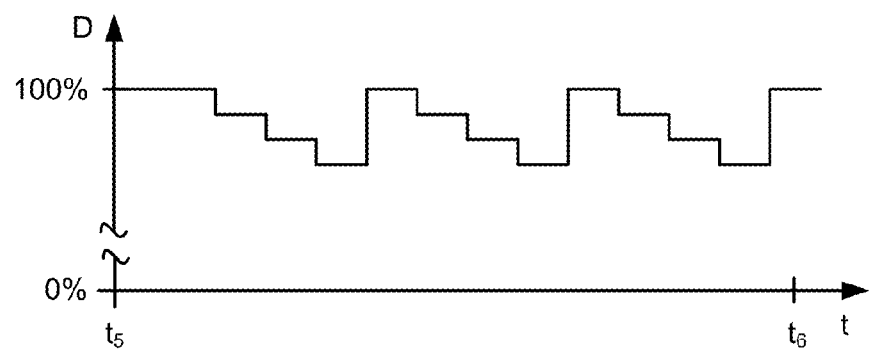

FIGS. 10a-c are graphs of the brightness level, switching frequency $f_{sw}$, and duty cycle for a modified hybrid dimming technique, according to an embodiment of the present invention. At high brightness levels, FM and burst control may be combined, as illustrated in this example. As can be seen in FIG. 10a, the brightness level begins at a maximum brightness level BL of 1024 in this example and decreases gradually as the switching frequency, graphed in FIG. 10b, increases and the duty cycle, graphed in FIG. 10c, decreases. In this particular example, $f_{sw}$ is increased as discussed above, however, burst control with large duty cycles may be used to achieve additional dimming steps in between the dimming steps achieved by FM. As the burst control only needs to provide an additional small dimming effect on top of the dimming achieved by FM, the duty cycle D of the burst control may remain very high, for example around 90% or higher in some embodiments. The high duty cycle D comes with the advantage that the reduction in droop loss may be maximized. In one embodiment, the modified hybrid dimming technique of FIGS. 10a-c may be implemented in an MCU or DSP in order to decrease component costs. Each of the dimming techniques described may be implemented on a wide variety of LED drivers, in particular drivers based on resonant topologies that change output power by varying the switching frequency.

Figure 11:
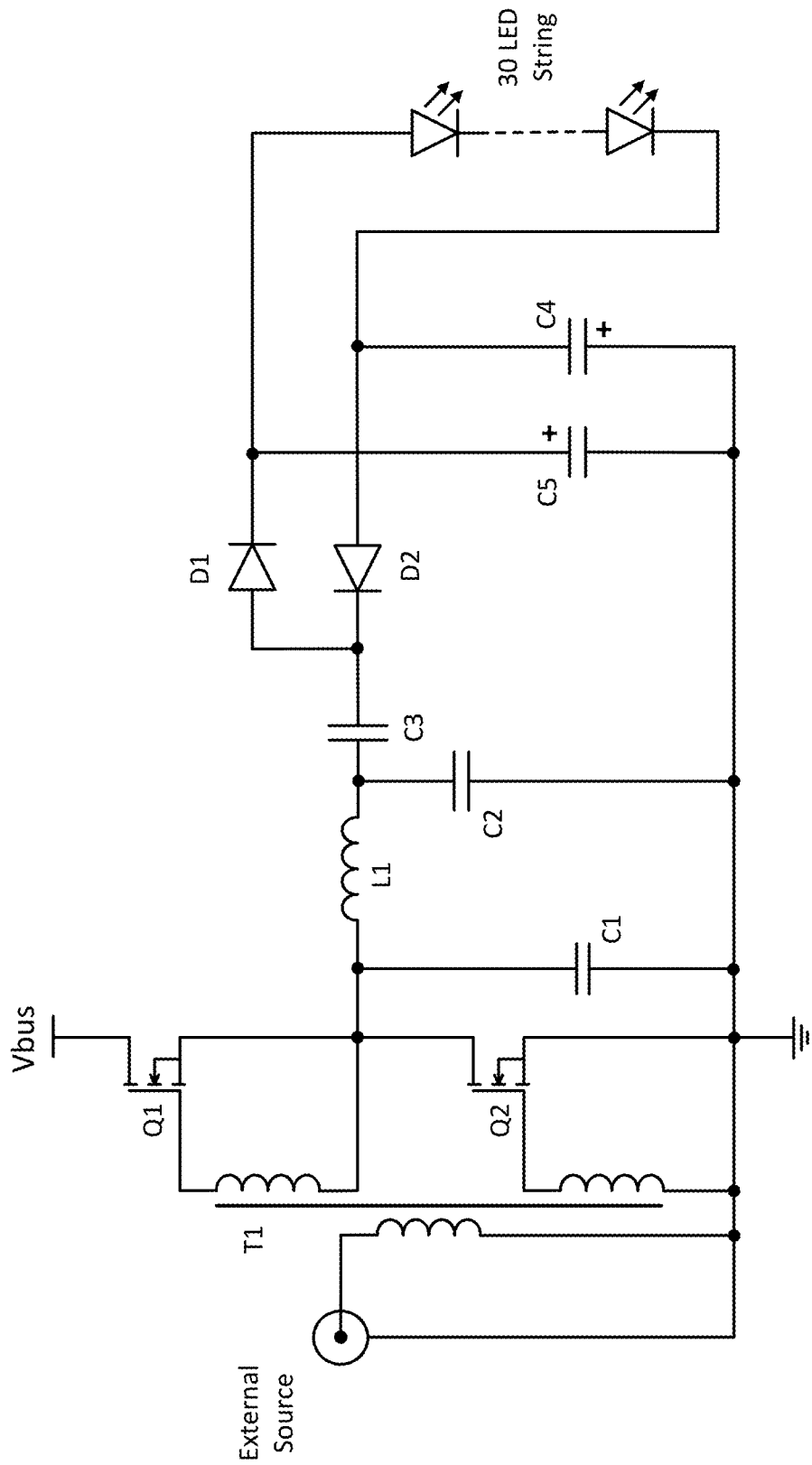
FIG. 11 shows an example driver circuit design for hybrid dimming control, according to one embodiment of the present invention.

FIG. 11 shows an example circuit design for hybrid dimming control, according to one embodiment of the present invention. In this example embodiment, a signal from a function generator is input to a half-bridge including transformer T1, and switches Q1 and Q2. Switch Q1 is connected to supply voltage Vbus, which may vary between 100-200V DC, in some embodiments. The switches could be, for example, IRF730 MOSFET switches, and the transformer drives the switches from an external function generator. Inductor L1 and capacitor C2, in this example embodiment, create a resonant network at a frequency of about 70 kHz (C2 about 22 nF and L1 about 240 uH). Capacitor C1, in this embodiment, is selected to minimize switching loss in switches Q1 and Q2 (C1=200 pF). DC current is provided to an LED string, which is a 30 LED string in this particular embodiment, through two fast recovery rectifying diodes D1 and D2 (D1=D2=1N4936). The value of electrolytic capacitors C4 and C5 is selected to ensure low ripple into the LED string at the carrier frequency (C4=C5=220 uF). Capacitor C3 is a DC blocking capacitor that blocks the path for DC current out of the power supply (C3=100 nF). The LED string, rectifying diodes, and capacitors C4 and C5 may comprise an LED assembly, such as the ones described in FIG. 7. The function generator used in some embodiments provides functions which may be available from the MCU. The generator may create bursts of sinusoidal signals with, for example, a carrier frequency varying from 70-140 kHz, a modulation frequency (i.e. repetition rate of bursts) around 100-200 Hz, and a duty ratio from 0.1-100%.

Figure 12:
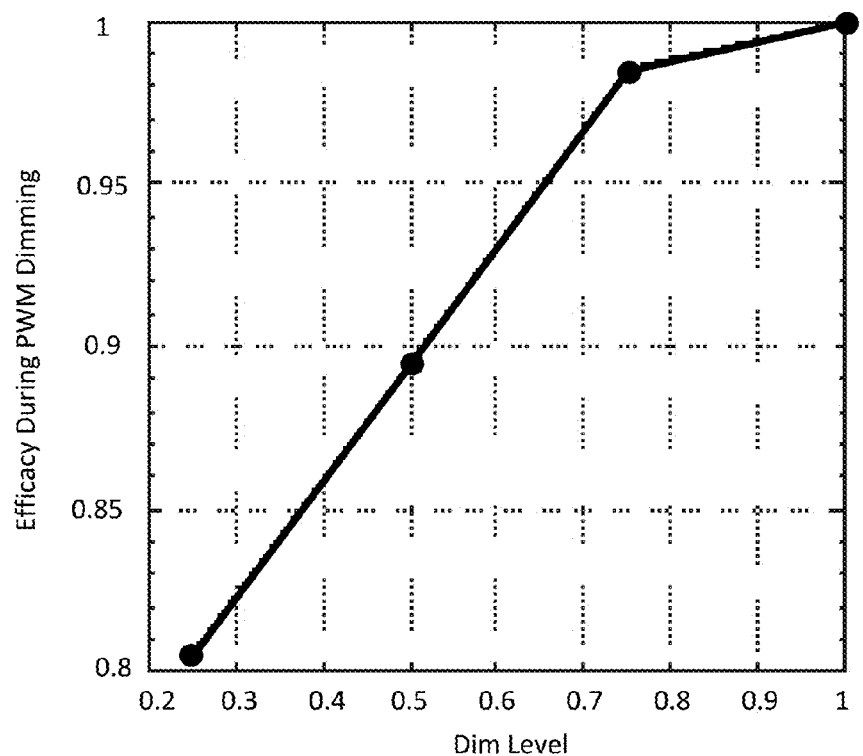
FIG. 12 is a graph of the dimming level of the LED string shown in FIG. 11, according to one embodiment of the present invention.

FIG. 12 is a graph of the dimming level of the LED string shown in FIG. 11, according to one embodiment of the present invention. The loss of lumen efficiency (efficacy) of the LED string operating on the converter of FIG. 11 in PWM dimming mode versus dimming by the DC current without ripples is demonstrated in this example. The lumen efficiency drops about 10% at one half the dimming level, and about 20% at one quarter the dimming level, in this example. A drop of LED lumen efficiency of the LED during PWM dimming is inherent to LED properties and is known as "droop." Different LEDs may exhibit different "droop" characteristics. DC dimming may be accomplished by varying the frequency of the carrier of the drive signal, in some embodiments. In the inverter topology shown in FIG. 11, the driving signal may remain consistently above the resonant frequency of the inverter in order to reduce switching loss.

Figure 13:
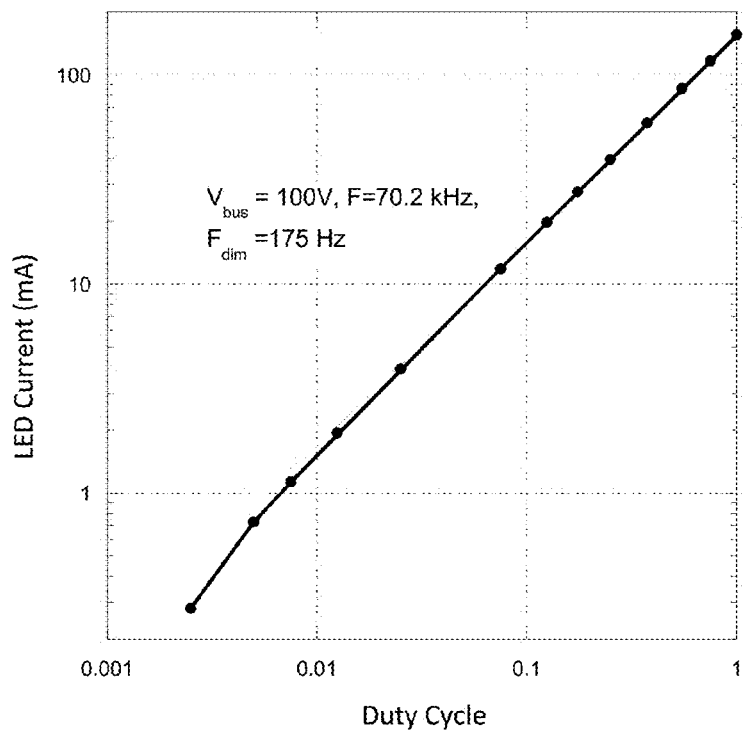
FIG. 13 is a graph of the LED current of the inverter of FIG. 11 as a function of the duty cycle, according to one embodiment of the present invention.

FIG. 13 is a graph of the LED current of the inverter of FIG. 11 as a function of the duty cycle, according to one embodiment of the present invention. This graph illustrates proportional control for a very wide range (about 200 times) using burst control dimming. The full range of dimming may exceed 500 times, in some embodiments. In this particular example, the voltage Vbus is set to 100V, the carrier frequency F is 70.2 kHz, and the dimming frequency $f_{dim}$ is 175 Hz. The carrier frequency F is identical to what is referred to as switching frequency $f_{sw}$ elsewhere in this text. The dimming frequency $F_{dim}$ is the frequency of the envelope of the pulse trains, also referred to as modulation frequency or the repetition rate of the bursts (see, for example, FIG. 2).

Figure 14:
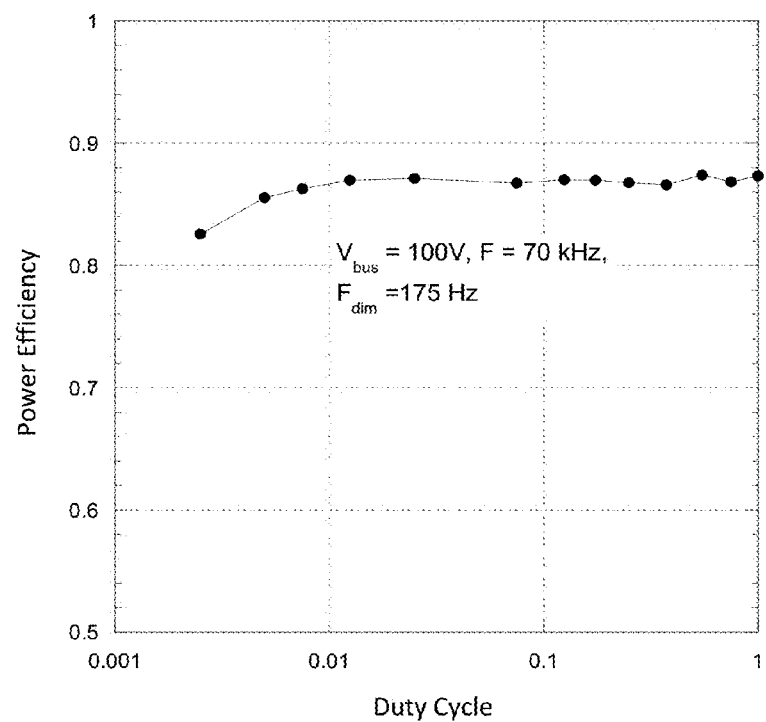
FIG. 14 is a graph of the power transfer efficiency of the inverter of FIG. 11 with respect to the duty cycle, according to one embodiment of the present invention.

FIG. 14 is a graph of the power transfer efficiency of the inverter of FIG. 11 with respect to the duty cycle, according to one embodiment of the present invention. In this example, the power transfer efficiency of the inverter in the burst control mode is substantially constant within the dimming range when the efficiency factor matters (down to 3%). In some embodiments, the power efficiency stays substantially constant due to the fact that the inverter does not consume power during pauses between bursts. A fully optimized resonant inverter could achieve power efficiencies in the range of 92-95%, in some embodiments. In this particular example, the voltage Vbus is set to 100V, the carrier frequency F is 70 kHz, and the dimming frequency $f_{dim}$ is 175 Hz.

Figure 15:
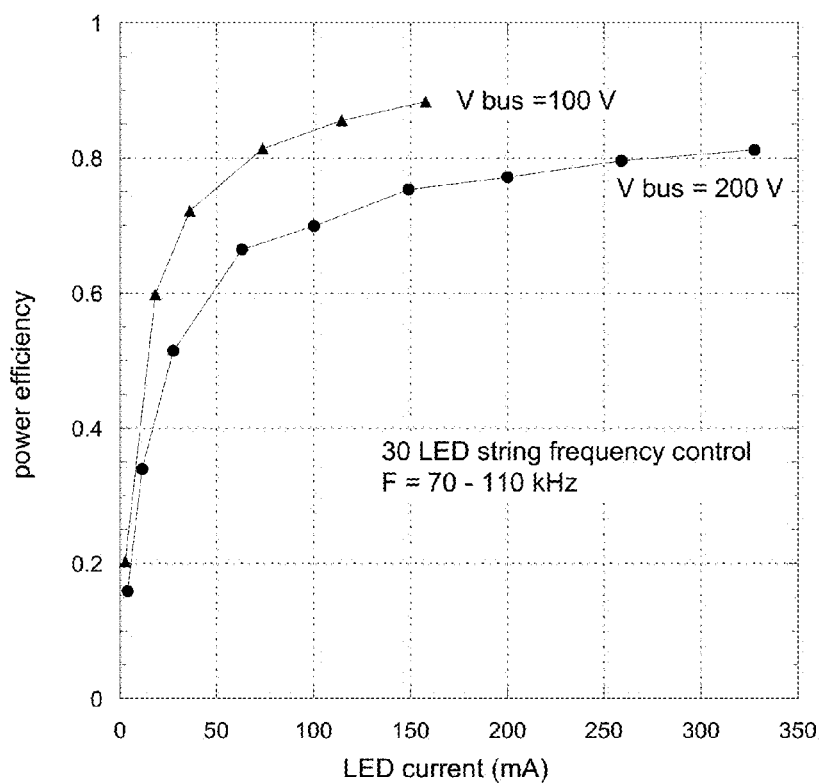
FIG. 15 is a graph of the power efficiency of the inverter of FIG. 11 with respect to the LED current, according to one embodiment of the present invention.

FIG. 15 is a graph of the power efficiency of the inverter of FIG. 11 with respect to the LED current, according to one embodiment of the present invention. Two plots are shown in this example figure, the upper one having a Vbus of 100V, and the lower one having a Vbus of 200V. The brightness is dimmed in this embodiment through frequency modulation dimming, and for each Vbus value, the 30 LED string frequency control is between 70-100 kHz. In one specific example, within the dimmed range of 1 to ¼ the full range, improvement of 2-3% may be achieved in the system lumen efficiency, compared with pure burst control dimming. In some embodiments, varying the "dead time" of switches Q1 and Q2 between switching pulses depending on the operating frequency and load characteristics may achieve greater gain.

Figure 16:
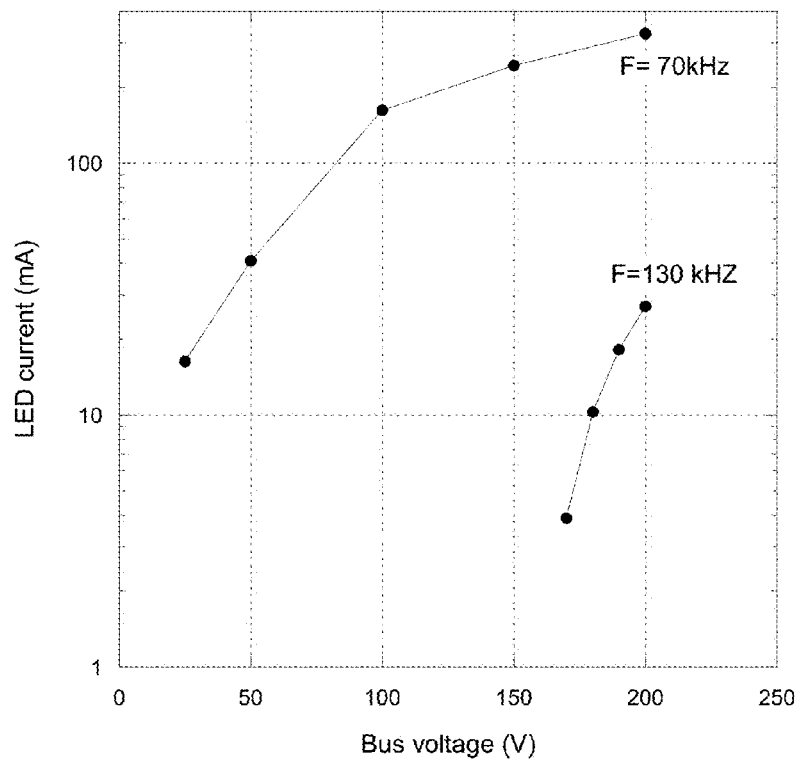
FIG. 16 is a graph of the LED current of the inverter of FIG. 11 with respect to the bus voltage Vbus, according to one embodiment of the present invention.

FIG. 16 is a graph of the LED current of the inverter of FIG. 11 with respect to the bus voltage Vbus, according to one embodiment of the present invention. Two plots are shown in this example figure, the upper one having a frequency of 70 kHz, and the lower one having a frequency of 130 kHz. This particular graph illustrates the limitations of frequency modulation dimming when it is used by itself. At the resonant frequency, 70 kHz (shown in the upper plot of FIG. 16), the LED string current is proportional to the DC bus voltage (proportionality coefficient is close to unity) for the voltage range between 100-200V. When for the purpose of dimming, the frequency is changed to 130 kHz (about 10 times dimming, shown in the lower plot of FIG. 16) this dependence becomes much steeper, making the LED current fluctuate considerably at small bus voltage changes, in some embodiments. The practical range for FM dimming is limited to a factor of 4-5, in this example.

Figure 17:
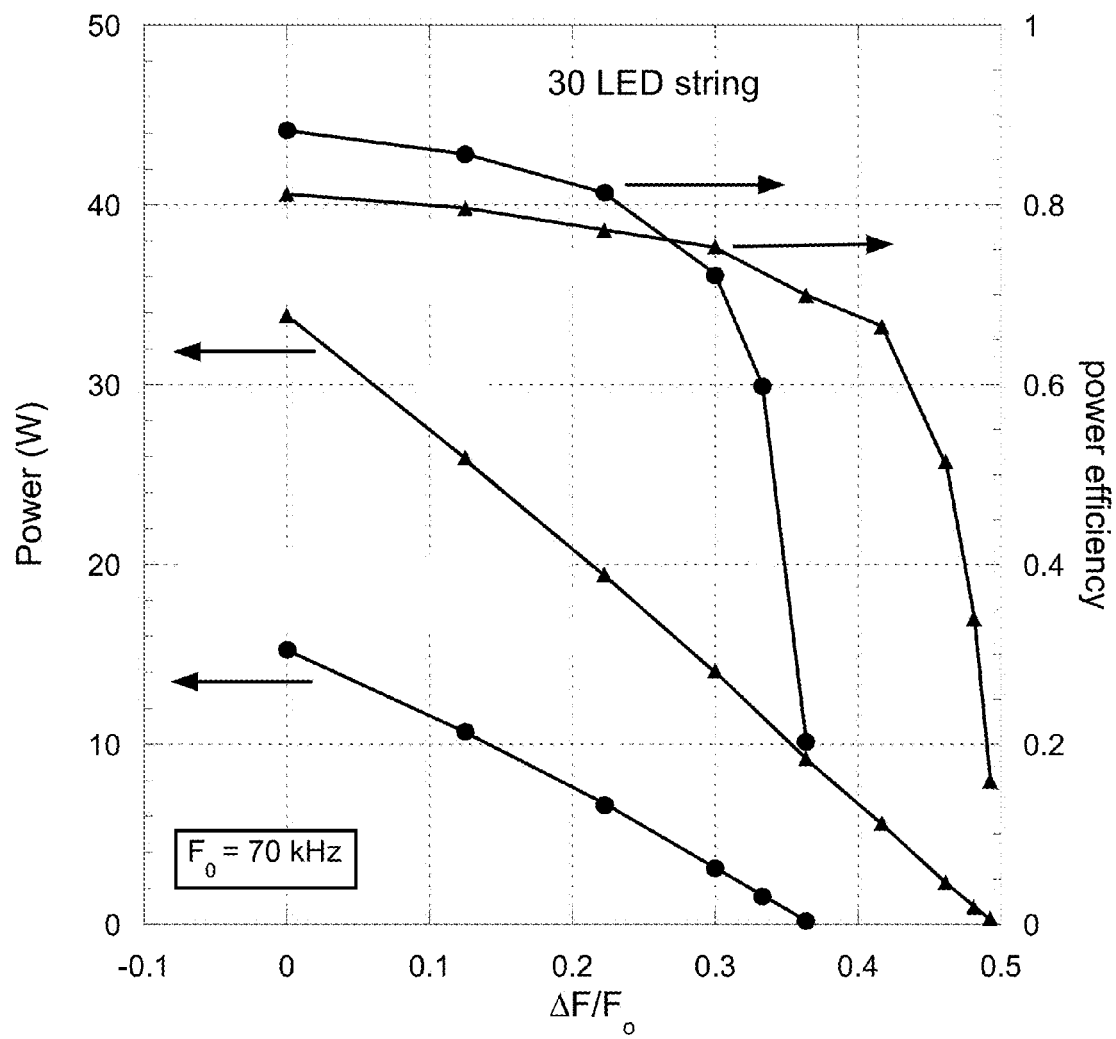
FIG. 17 is a graph of the power and power efficiency of the inverter of FIG. 11 with respect to $\Delta F/F_O$, according to one embodiment of the present invention.

FIG. 17 is a graph of the power and power efficiency of the inverter of FIG. 11 with respect to $\Delta F/F_O$, according to one embodiment of the present invention. This particular graph includes four plots, the y-axis on the right side shows the power efficiency from 0-1, and the y-axis on the left side of the graph shows the power. The x-axis gives the deviation of the switching frequency $f_{sw}$ from the resonant frequency $F_0$ (sometimes also referred to as) $f_r$), calculated as $\Delta F/F_0$. Plots 1701 and 1702 show the power efficiency with respect to $\Delta F/F_O$, hence the arrows pointing to the right y-axis; while plots 1703 and 1704 show the power with respect to $\Delta F/F_0$, hence the arrows pointing to the left y-axis. In this particular example, $F_0$ is set to 70 kHz. Plots 1702 and 1703 have a bus voltage of 200V and an LED current of 330 mA, while plots 1701 and 1704 have a bus voltage of 100V and an LED current of 175 mA. In some embodiments, the hybrid control has the potential for sustaining high lumen efficiency in the dimming range of 100%-20% when applying frequency dimming, and ensuring the wide range of proportional control when applying the burst cycle control.

Figure 18A:
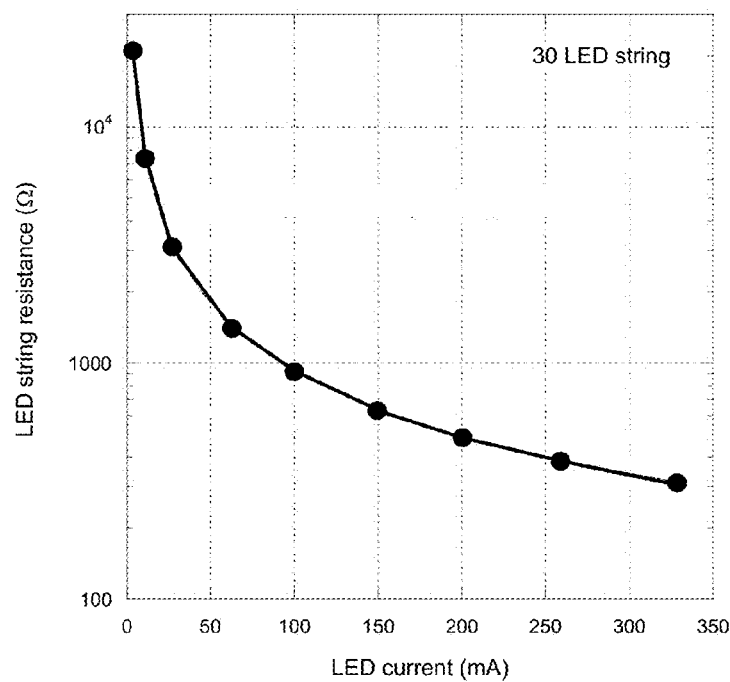
FIGS. 18a-b are graphs of the LED string resistance for the 30 LED string of FIG. 11, according to one embodiment of the present invention.
Figure 18B:
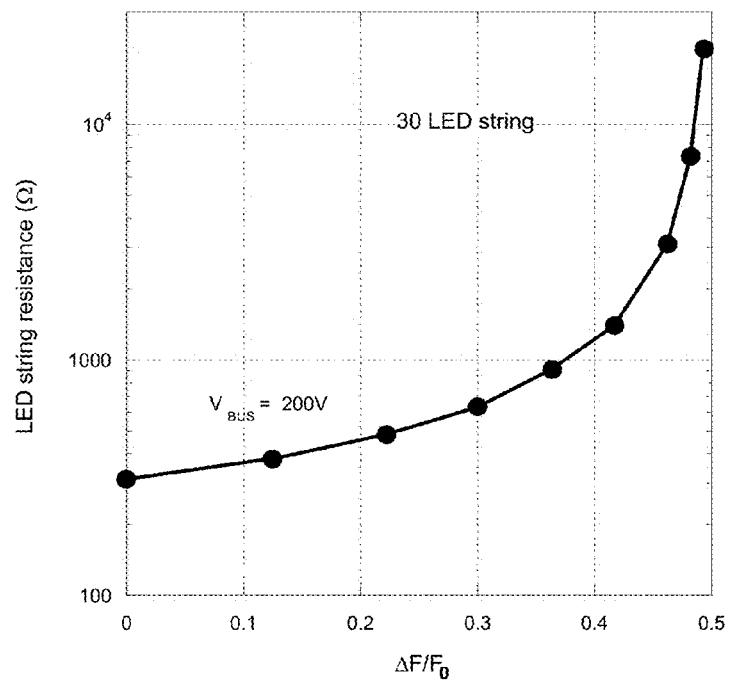

FIGS. 18a-b are graphs of the LED string resistance for the 30 LED string of FIG. 11, according to one embodiment of the present invention. The graph shown in FIG. 18a shows the LED string resistance as a function of the LED current, while FIG. 18b shows the LED string resistance as a function of the deviation of the switching frequency $f_{sw}$ from the resonant frequency $F_0$, calculated as $\Delta F/F_0$. In order to achieve the desired LED string resistance, either the LED current or $\Delta F/F_0$ may be adjusted according to these graphs, in some embodiments.

Methodology

Figure 19:
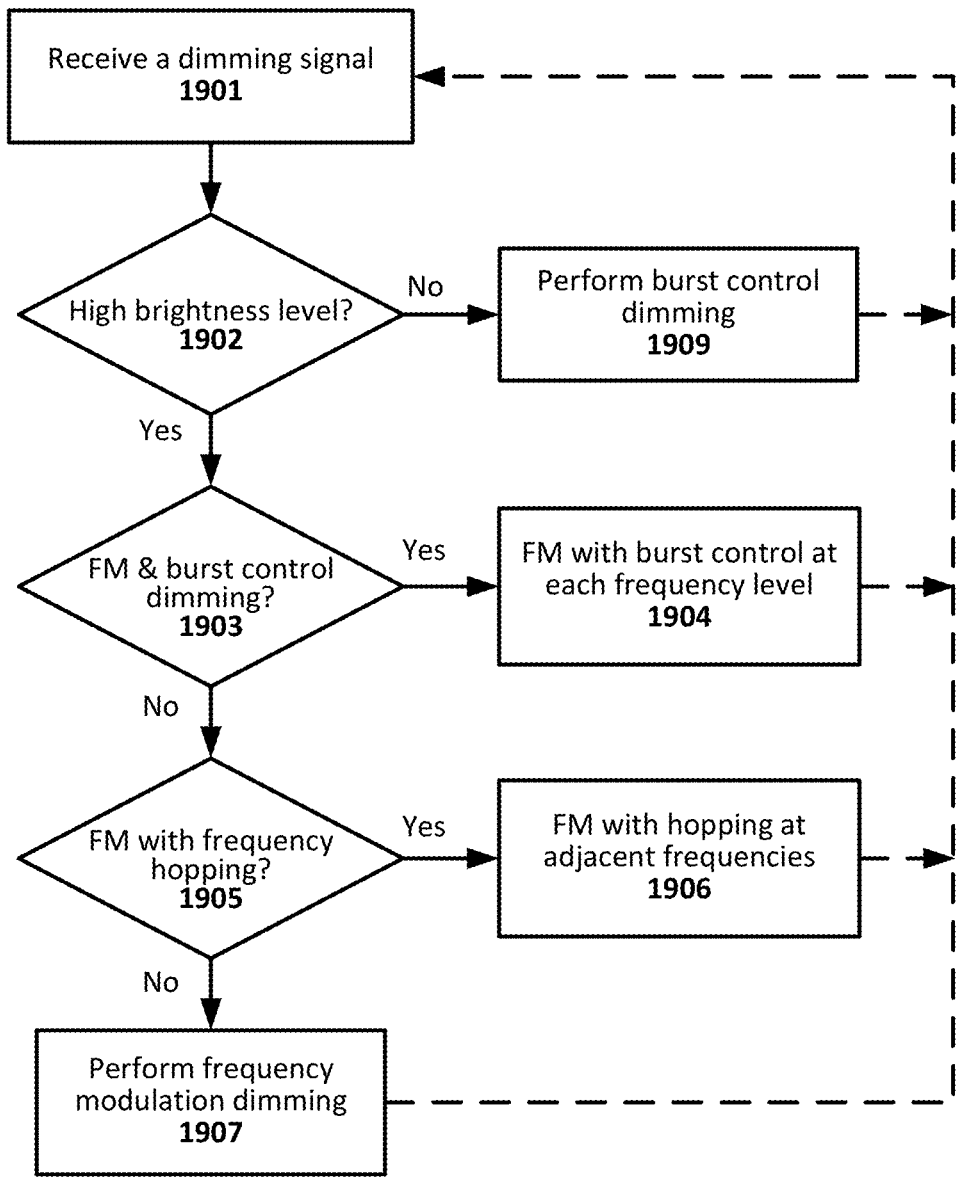
FIG. 19 illustrates a method for implementing both FM and burst control dimming in LED lighting drivers, according to one embodiment of the present invention.

FIG. 19 illustrates a method for implementing both FM and burst control dimming in LED lighting drivers, according to one embodiment of the present invention. The method may begin with receiving 1901 a dimming signal at an LED driver circuit. The method may continue with determining 1902 whether the current brightness level is a high brightness level. In some embodiments, high brightness levels may include light levels between 100%-20% of full brightness. If the brightness level is low, the method may continue with performing burst control dimming 1909. If the brightness level is high, the method may continue with determining 1903 whether FM and burst control dimming (=hybrid dimming) is to be performed. If FM and burst control dimming is to be performed, the method may continue with performing 1904 FM dimming with burst control dimming at each frequency level, as described in the example shown in FIGS. 10a-c. If FM and burst control dimming is not performed, the method may continue with determining 1905 whether FM with frequency hopping is to be performed. If FM with frequency hopping is to be performed, the method may continue with performing 1906 FM dimming with frequency hopping between neighboring frequencies. If frequency hopping is not performed, the method may continue with performing 1907 FM dimming. While performing burst control dimming 1909, FM dimming 1907, FM dimming with burst control dimming 1904, or FM dimming with frequency hopping 1906 the method may continue to be receptive to new dimming signal and may jump out of 1909, 1907, 1904, or 1906 and back to 1901 (dashed lines) when a new dimming signal is available.

Numerous variations and embodiments will be apparent in light of this disclosure. One example embodiment provides a lighting driver circuit. The driver circuit includes an AC current source driven by a pulse train having a duty cycle, the current source configured to output a current to at least one LED assembly. The driver circuit further includes a controller operatively coupled to the current source and configured to, in response to a dimming signal, perform frequency modulation dimming at high brightness levels wherein frequency modulation dimming comprises changing the frequency of pulses within the pulse train, and perform burst control dimming at low brightness levels wherein burst control dimming comprises changing the duty cycle of the pulse train. In some cases, dimming at high brightness levels comprises dimming the at least one LED assembly from 100% brightness to about 20% brightness, and dimming at low brightness levels comprises dimming the at least one LED assembly below 20% brightness. In some cases, dimming at high brightness levels comprises dimming the at least one LED assembly by increasing the frequency of the pulses within the pulse train up to a maximum frequency threshold. In one such case, the AC current source comprises a resonant tank circuit and the maximum frequency threshold is the resonant frequency of the resonant tank circuit. In some cases, changing the frequency of the pulses within the pulse train comprises increasing the frequency in a plurality of frequency levels, and wherein frequency modulation dimming further comprises decreasing the duty cycle of the pulse train at each of the plurality of frequency levels. In some cases, changing the frequency of the pulses within the pulse train comprises increasing the frequency in a plurality of frequency levels, and wherein frequency modulation dimming further comprises hopping between neighboring frequencies at each of the plurality of frequency levels. In some cases, the dimming signal comprises at least one of: a DC voltage value, phase-cut waveform, DMX signal, DALI signal, power line communication, and/or wireless communication. In some cases, the driver circuit includes the at least one LED assembly wherein the at least one LED assembly includes at least one rectifying diode and at least one capacitor. In some cases, the driver circuit includes at least one current splitter configured to enable parallel driving of a plurality of LED assemblies.

Another example embodiment provides a method of dimming an LED assembly. The method includes receiving a dimming signal at a controller, and determining (by the controller) the current brightness level of at least one LED assembly. The method further includes performing frequency modulation dimming at high brightness levels, wherein frequency modulation dimming comprises changing a frequency of pulses within a pulse train driving a current source. The method further includes performing burst control dimming at low brightness levels, wherein burst control dimming comprises changing a duty cycle of the pulse train driving the current source. The method further includes outputting an output current of the current source to the at least one LED assembly. In some cases, dimming at high brightness levels comprises dimming the at least one LED assembly from 100% brightness to about 20% brightness, and dimming at low brightness levels comprises dimming the at least one LED assembly below 20% brightness. In some cases, dimming at high brightness levels comprises dimming the at least one LED assembly by increasing the frequency of the pulses with the pulse train up to a maximum frequency threshold. In some cases, the current source comprises a resonant tank circuit and the maximum frequency threshold is the resonant frequency of the resonant tank circuit. In some cases, changing the frequency of the pulses within the pulse train comprises increasing the frequency in a plurality of frequency levels, and wherein frequency modulation dimming further comprises decreasing the duty cycle of the pulse train at each of the plurality of frequency levels. In some cases, changing the frequency of the pulses within the pulse train comprises increasing the frequency in a plurality of frequency levels, and wherein frequency modulation dimming further comprises hopping between neighboring frequencies at each of the plurality of frequency levels.

Another example embodiment provides a lighting system. The system includes at least one LED assembly, and an AC current source driven by a pulse train having a duty cycle, the current source configured to output a current to the at least one LED assembly. The system further includes a controller operatively coupled to the current source and configured to, in response to a dimming signal, perform frequency modulation dimming at high brightness levels wherein frequency modulation dimming comprises changing the frequency of pulses within the pulse train, and perform burst control dimming at low brightness levels wherein burst control dimming comprises changing the duty cycle of the pulse train. In some cases, the AC current source comprises a resonant tank circuit, and dimming at high brightness levels comprises increasing the frequency of the pulses within the pulse train up to the resonant frequency of the resonant tank circuit. In some cases, changing the frequency of the pulses within the pulse train comprises increasing the frequency in a plurality of frequency levels, and wherein frequency modulation dimming further comprises decreasing the duty cycle of the pulse train at each of the plurality of frequency levels. In some cases, changing the frequency of the pulses within the pulse train comprises increasing the frequency in a plurality of frequency levels, and wherein frequency modulation dimming further comprises hopping between neighboring frequencies at each of the plurality of frequency levels. In some cases, the system includes at least one current splitter configured to enable parallel driving of a plurality of LED assemblies.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A lighting driver circuit, comprising:
    an AC current source driven by a pulse train having a duty cycle, the current source configured to output a current to at least one LED assembly and the AC current source comprises a resonant tank circuit; and
    a controller operatively coupled to the current source and configured to, in response to a dimming signal, perform frequency modulation dimming at high brightness levels wherein frequency modulation dimming comprises changing the frequency of pulses within the pulse train, and perform burst control dimming at low brightness levels wherein burst control dimming comprises changing the duty cycle of the pulse train wherein dimming at high brightness levels comprises dimming the at least one LED assembly by increasing the frequency of the pulses within the pulse train up to a maximum frequency threshold and the maximum frequency threshold is the resonant frequency of the resonant tank circuit.

2. The lighting driver circuit of claim 1, wherein dimming at high brightness levels comprises dimming the at least one LED assembly from 100% brightness to 20% brightness, and dimming at low brightness levels comprises dimming the at least one LED assembly below 20% brightness.

3. The lighting driver circuit of claim 1, wherein changing the frequency of the pulses within the pulse train comprises increasing the frequency in a plurality of frequency levels, and wherein frequency modulation dimming further comprises decreasing the duty cycle of the pulse train at each of the plurality of frequency levels.

4. The lighting driver circuit of claim 1, wherein changing the frequency of the pulses within the pulse train comprises increasing the frequency in a plurality of frequency levels, and wherein frequency modulation dimming further comprises hopping between neighboring frequencies at each of the plurality of frequency levels.

5. The lighting driver circuit of claim 1, wherein the dimming signal comprises at least one of: a DC voltage value, phase-cut waveform, DMX signal, DALI signal, power line communication, and/or wireless communication.

6. The lighting driver circuit of claim 1, further comprising the at least one LED assembly wherein the at least one LED assembly includes at least one rectifying diode and at least one capacitor.

7. The lighting driver circuit of claim 1, further comprising at least one current splitter configured to enable parallel driving of a plurality of LED assemblies.

8. A method of dimming an LED assembly, comprising:
    receiving a dimming signal at a controller;
    determining, by the controller, the current brightness level of at least one LED assembly;
    performing frequency modulation dimming at high brightness levels, wherein frequency modulation dimming comprises changing a frequency of pulses within a pulse train driving a current source;
    performing burst control dimming at low brightness levels, wherein burst control dimming comprises changing a duty cycle of the pulse train driving the current source wherein changing the frequency of the pulses within the pulse train comprises increasing the frequency in a plurality of frequency levels, and wherein frequency modulation dimming further comprises decreasing the duty cycle of the pulse train at each of the plurality of frequency levels; and
    outputting an output current of the current source to the at least one LED assembly.

9. The method of claim 8, wherein dimming at high brightness levels comprises dimming the at least one LED assembly from 100% brightness to 20% brightness, and dimming at low brightness levels comprises dimming the at least one LED assembly below 20% brightness.

10. The method of claim 8, wherein dimming at high brightness levels comprises dimming the at least one LED assembly by increasing the frequency of the pulses with the pulse train up to a maximum frequency threshold.

11. The method of claim 10, wherein the current source comprises a resonant tank circuit and the maximum frequency threshold is the resonant frequency of the resonant tank circuit.

12. The method of claim 8, wherein changing the frequency of the pulses within the pulse train comprises increasing the frequency in a plurality of frequency levels, and wherein frequency modulation dimming further comprises hopping between neighboring frequencies at each of the plurality of frequency levels.

13. A lighting system comprising:
at least one LED assembly;
an AC current source driven by a pulse train having a duty cycle, the current source configured to output a current to the at least one LED assembly; and
a controller operatively coupled to the current source and configured to, in response to a dimming signal, perform frequency modulation dimming at high brightness levels wherein frequency modulation dimming comprises changing the frequency of pulses within the pulse train, and perform burst control dimming at low brightness levels wherein burst control dimming comprises changing the duty cycle of the pulse train wherein the AC current source comprises a resonant tank circuit, and dimming at high brightness levels comprises increasing the frequency of the pulses within the pulse train up to the resonant frequency of the resonant tank circuit.

14. The system of claim 13, wherein changing the frequency of the pulses within the pulse train comprises increasing the frequency in a plurality of frequency levels, and wherein frequency modulation dimming further comprises decreasing the duty cycle of the pulse train at each of the plurality of frequency levels.

15. The system of claim 13, wherein changing the frequency of the pulses within the pulse train comprises increasing the frequency in a plurality of frequency levels, and wherein frequency modulation dimming further comprises hopping between neighboring frequencies at each of the plurality of frequency levels.

16. The system of claim 13, further comprising at least one current splitter configured to enable parallel driving of a plurality of LED assemblies.

* * * * *